United States Patent
Kinoshita

(10) Patent No.: US 6,493,548 B1
(45) Date of Patent: Dec. 10, 2002

(54) MOBILE TELEPHONE TERMINAL WITH IMPROVED UTILITY

(75) Inventor: Masaki Kinoshita, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/369,335

(22) Filed: Aug. 6, 1999

(30) Foreign Application Priority Data

Sep. 30, 1998 (JP) .......................................... 10-277652

(51) Int. Cl.[7] .............................................. H04M 11/10
(52) U.S. Cl. ...................... 455/412; 455/413; 455/414; 455/415; 379/88.21
(58) Field of Search ................................ 455/412, 413, 455/414, 415, 411; 379/88, 142, 88.21, 88.28

(56) References Cited

U.S. PATENT DOCUMENTS

| | | | | |
|---|---|---|---|---|
| 5,610,970 A | * | 3/1997 | Fuller et al. | 379/57 |
| 5,661,788 A | * | 8/1997 | Chin | 379/142 |
| 5,748,709 A | * | 5/1998 | Sheerin | 379/67 |
| 5,832,062 A | * | 11/1998 | Drake | 379/88 |
| 6,081,704 A | * | 6/2000 | Oshima | 455/410 |

FOREIGN PATENT DOCUMENTS

| | | |
|---|---|---|
| EP | 0399520 | 11/1990 |
| EP | 0494525 | 7/1992 |
| EP | 0567135 | 10/1993 |
| EP | 0783219 | 7/1997 |
| EP | 0825751 | 2/1998 |
| GB | 2280084 | 1/1995 |
| GB | 2318702 | 4/1998 |
| GB | 2318707 | 4/1998 |

* cited by examiner

Primary Examiner—Thanh Cong Le
Assistant Examiner—Tuan Tran
(74) Attorney, Agent, or Firm—Rothwell, Figg, Ernst & Manbeck

(57) ABSTRACT

A mobile communication terminal includes timer for detecting the time of an incoming call, a caller number registration table for storing caller numbers, answer message ID numbers and time-dependent switching codes in relation to each other, the time-dependent control codes designating callers for whom answer messages are switched depending on a time zone in which the call is made. There is thus provided a capability of selecting an answer message for a caller based on the caller number included in the incoming call signal and switching between answer messages based on the time of call incoming detected by the timer.

5 Claims, 7 Drawing Sheets

FIG.4

| NAME | PHONE NUMBER | ANSWER MESSAGE 1 (TIME ZONE 1) | ANSWER MESSAGE 2 (TIME ZONE 2) | TIME-DEPENDENT SWITCHING | FORCED ALART |
|---|---|---|---|---|---|
| ICHIRO TOYOTA | 020-123-4567 | 1 | 2 | 1 | 1 |
| JIRO SUZUKI | 020-234-5678 | 2 | | | |
| SABURO MATSUDA | 020-345-6789 | 3 | 2 | 1 | |
| SHIRO HONDA | 020-456-7890 | 1 | 3 | 1 | |
| TARO MITSUBISHI | 020-567-8901 | 3 | | | 1 |

1-3 INDICATE ID NO. OF MESSAGE    "1" INDICATES TIME-DEPENDENT SWITCHING

ANSWER MESSAGE 1: THIS IS XX. I CANNOT TAKE THE PHONE NOW BECAUSE OF THE MEETING. PLEASE LEAVE A MASSAGE SO I CAN RETURN A CALL.

ANSWER MESSAGE 2: THIS IS XX. I HAVE LEFT THE OFFICE. PLEASE LEAVE A MESSAGE SO I CAN RETURN A CALL TOMORROW.

ANSWER MESSAGE 3: THIS IS XX. I CANNOT TAKE THE PHONE NOW. PLEASE LEAVE A MESSAGE.

MOBILE TELEPHONE TERMINAL WITH IMPROVED UTILITY

BACKGROUND OF THE INVENTION

1. Field of the Invention

The present invention generally relates to portable telephone terminals and, more particularly, to a portable telephone terminal having an answering function for switching between answer messages in accordance with a caller number and the time, and also to a terminal operable by a remote telephone set using caller number authentication.

2. Description of the Related Art

Japanese Laid-Open Patent Application No. 10-66145 discloses a mobile communication terminal having an answering function for switching between answer messages depending on a caller number. A call signal incoming at a called terminal from a calling terminal includes a caller number and control information for controlling the called terminal. The called terminal controls an answering mode and switches between answer messages based on the caller number and the control information. Answer messages for individual expected callers are registered in the called terminal and retrieved according to the flowchart of FIG. 7. Each answer message has associated therewith a message identification number.

Referring to FIG. 7, when it is determined in step ST1001 that there is an incoming call, a determination is made in step ST1002 as to whether the automatic answering mode is activated. When the answering mode is activated, a determination is made in step ST1003 as to whether a calling number is identified. If the calling number is identified, a determination is then made in step ST1005 as to whether the calling number is registered in a directory. If the calling number is registered, a determination is made in step ST1006 as to whether the forced answering mode is on. If it is determined that the forced answering mode is turned on, a determination is made in step ST1007 as to whether a predetermined answer message is to be used to automatically respond to the particular caller. If an affirmative answer is yielded in step ST1007, the answer message for that caller is used for response in step ST1008. If a negative answer is yielded in steps ST1003, ST1005, ST1006 and ST1007, a default answer message is used for response to that caller in step ST1004.

If it is determined in step ST1002 that the answering mode is not activated, similar steps (ST1011, ST1012 and ST1009) are executed. When it is determined in step ST1009 that the forced answering mode is not turned on, a normal voice call proceeds in step ST1010.

Japanese Laid-Open Patent Application No. 10-126495 and Japanese Laid-Open Patent Application No. 9-182158 disclose a portable telephone set provided with a capability whereby the portable telephone set, if lost, can be remotely operated by another telephone set so that a dialing operation using the lost portable telephone set is prohibited. Japanese Laid-Open Patent Application No. 10-126495 also discloses a portable telephone set configurable, if lost, for a fixed call destination by feeding a remote operation signal to the lost portable telephone set. Operations related to the memory are prohibited so that the leak of personal information and the illegal use of the portable telephone set are prevented. Japanese Laid-Open Patent Application No. 9-182158 discloses a system wherein a lock preventing an illegal use of a lost portable telephone set is registered in a base station using another telephone set so that call origination by an illegal user is prevented.

A rapidly increasing number of portable telephone sets is being used because of the convenience it provides in enabling communication not bounded by time and place constraints. When a user is not able to answer a call, the answering function is utilized. The related-art mobile communication terminal disclosed in Japanese Laid-Open Patent Application No. 10-66145 is provided with an answering function for switching between answer messages depending on the caller number. However, related-art mobile communication terminals are not capable of switching between answer messages for a particular caller in accordance with the time that a call is received.

A user of a portable telephone set may want to answer a call from a particular caller but does not want to answer a call from the others. The answering function that meets such a requirement should be provided with a forced alert function for alerting a user of a call from a registered caller even when the answering mode is activated.

Another problem with the portable telephone system according to the related art is that an input of a password is required when a user calls a lost portable telephone set and remotely sets up a locked dialing option in the lost telephone set. When the user has forgotten the password, the locked dialing option cannot be set up when necessary.

SUMMARY OF THE INVENTION

Accordingly, an object of the present invention is to provide a portable telephone set in which the aforementioned problems are eliminated.

Another and more specific object of the present invention is to provide a mobile communication terminal such as a portable telephone set provided with an answering function that enables switching between answer messages in accordance with the time of calling.

Still another object of the present invention is to provide a portable telephone set in which a remote operation not requiring an input of a password is enabled by specifying terminal numbers (caller numbers) authorized to perform a remote operation for a locked dialing option or a voice mail option.

The aforementioned objects can be achieved by a mobile communication terminal comprising: timer means for detecting the time when a call incoming signal including a caller number is received from an originating terminal; caller number storage means for storing control codes in relation to expected caller numbers, the control codes being used to switch between different modes of operation of the mobile communication terminal; answer message storage means for storing messages to be returned to a caller; and answer message selecting means referring to said caller number storage means so as to determine whether the caller number included in the incoming call signal is registered in said caller number storage means, reading from said caller number storage means the control code associated with the caller number, and selecting an answer message stored in said answer message storage means based on the caller number, the control code and the time of call detected by said timer means.

The caller number storage means may store caller numbers, caller names corresponding to the caller numbers and time-dependent switching codes in relation to each other, the time-dependent control codes designating callers for whom answer messages are switched depending on a time zone in which the call is made.

The caller number storage means may store caller numbers, caller names corresponding to the caller numbers and forced alert codes in relation to each other, the forced alert code designating callers triggering a forced alert option for alerting a user of the mobile communication terminal of an incoming call even when an answering mode is activated.

The caller number storage means may store caller numbers, caller names corresponding to the caller numbers and locked dialing codes in relation to each other, the locked dialing codes designating callers authorized to set up a locked dialing option in the mobile communication terminal from a calling terminal.

The caller number storage means may store caller numbers, caller names corresponding to the caller numbers and voice mail codes in relation to each other, the voice mail codes designating callers authorized to set up a voice mail option in the mobile communication terminal from a calling terminal.

According to the invention, mobile communication terminal is provided with an answering function capable of selecting an answer message in accordance with the caller number included in an incoming call signal and switching between answer messages depending on the time of call. Since it is possible to prepare a variety of answer messages suitable for individual expected callers, the answering function is enhanced.

The mobile communication terminal according to the invention is provided with the capability of alerting the user if a call is received from a designated caller even when the answering mode is activated, by recognizing the caller prior to an off-hook operation based on the caller number included in the incoming call signal. Therefore, it is possible to distinguish between callers requiring an answer and callers not requiring an answer.

In further accordance with the invention, when the caller number matches the registered number assigned a remote operation code, the caller is authorized to perform a remote operation such as setting up of a locked dialing option or a voice mail option. With this, it is possible to perform a remote operation without a password by calling from a registered terminal.

BRIEF DESCRIPTION OF THE DRAWINGS

Other objects and further features of the present invention will be apparent from the following detailed description when read in conjunction with the accompanying drawings, in which:

FIG. 4 shows a caller number registration table;

DETAILED DESCRIPTION OF THE PREFERRED EMBODIMENTS

Embodiment 1

Figure 1:
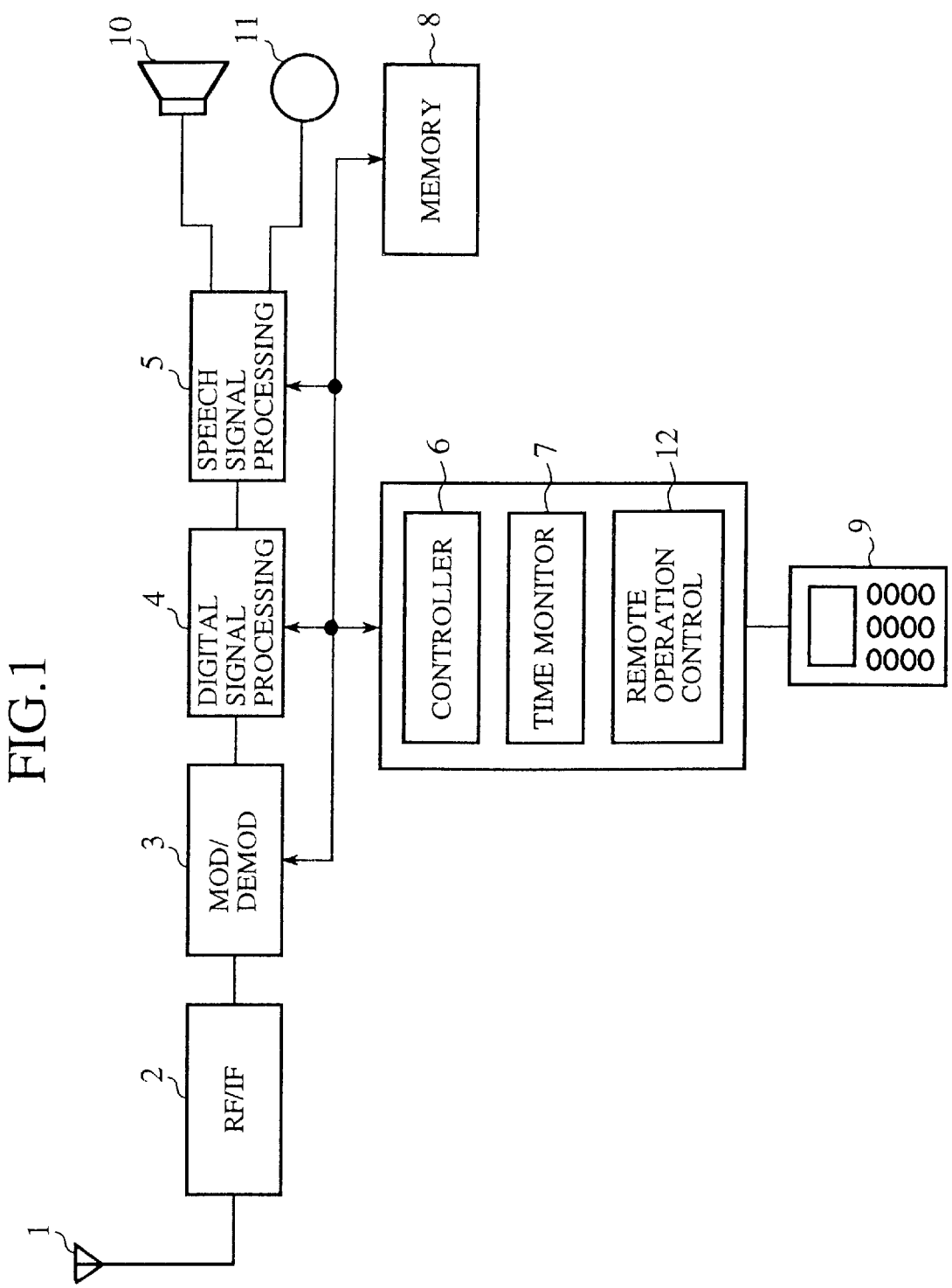
FIG. 1 is a block diagram showing the construction of a mobile communication terminal according to a first embodiment.
Figure 2:
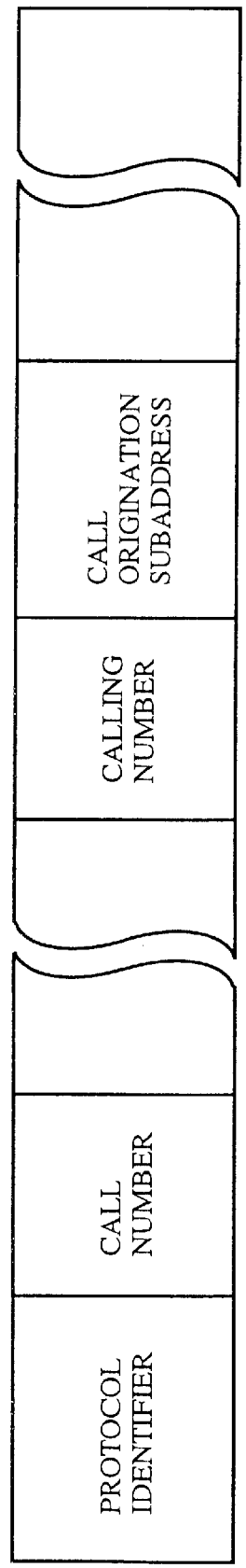
FIG. 2 is a diagram showing a call setting message.
Figure 3:
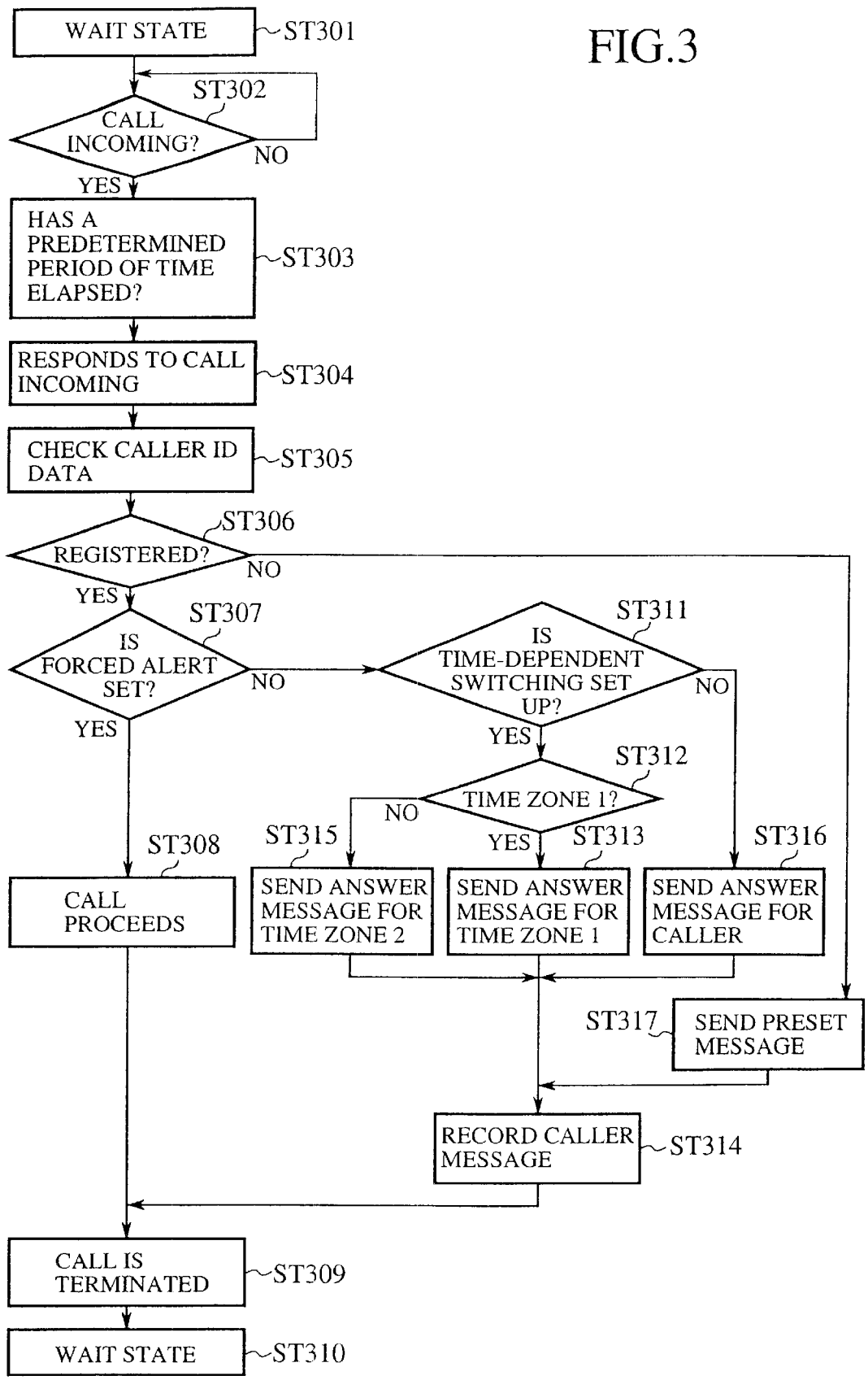
FIG. 3 is a flowchart for the control of the answering function.

FIG. 1 is a block diagram showing the construction of a mobile communication terminal according to the first embodiment. FIG. 2 is a diagram showing a call setting message. FIG. 3 is a flowchart for the control of the answering function. FIG. 4 shows a caller number registration table.

The mobile communication terminal according to the first embodiment comprises an antenna for transmitting and receiving a modulated radio wave, a frequency converter (RF/IF unit) 2 for converting the frequency of the modulated radio wave, a modulating/demodulating unit 3 for modulating a carrier wave in accordance with a base band signal and for demodulating the modulated radio wave received via the antenna 1 to retrieve the base band signal. There are further provided a digital signal processing circuit 4 for subjecting the base band signal to TDMA signal processing, a speech signal processing circuit 5 for processing the base band signal, a controller 6, a time monitor unit 7 that includes a timer circuit, a memory 8, a keyboard 9, a speaker 10, a microphone 11 and a remote operation controller 12.

The memory 8 provides means for storing caller numbers and constitutes an answer message selecting means. In the memory 8, caller numbers, caller names, control codes (time-dependent switching codes, forced alert codes, message numbers selected in time zone 1 and in time zone 2) are stored. The controller 9 provides means for referring to the memory 8 and recognizing the calling terminal by referring to the caller number, means for referring to the caller number and recognizing the caller. The controller 9 also constitutes the answer message selecting means.

FIG. 2 is a diagram showing a call setting message constituting a signal received by an antenna of a called mobile communication terminal from a calling mobile communication terminal. Call origination occurs by the call setting message shown in FIG. 2 being sent from a base station to a call destination mobile communication terminal. The call setting message includes a protocol identifier, a called number, a calling number and an origination subaddress indicating the subaddress of a call originator.

The answering function of the mobile communication terminal according to the first embodiment includes an answer message selecting capability whereby an answer message is selected in accordance with the caller and also includes a forced alert capability for alerting a terminal user of call incoming from a designated caller. The answer message selecting capability is controlled according to the time. A description will now be given of the operation according to the first embodiment with reference to FIG. 3.

A portable telephone terminal (hereinafter, simply referred to as a terminal) is in a wait state in step ST301. A call is received in step ST302. After a predetermined period of time elapses (ST303), the terminal responds to call incoming (ST304). The terminal refers to the caller number registration table shown in FIG. 4 (ST305). If it is determined that the caller ID retrieved from the call setting message is registered in the caller number registration table (ST306), a determination is made as to whether the forced alert is set (ST307). If the forced alert is set, a call can proceed (ST308). When the call is terminated (ST309), the mobile communication terminal is returned to a wait state (ST310).

If it is determined that the caller ID retrieved from the call setting message is not registered in the caller number registration table (ST306), a preset message is sent to the network (ST317). When the preset message has been sent, the caller is allowed to leave a message (ST314). Control is then turned to step ST309.

If the originating ID is registered in the caller number registration table but the forced alert is not set, a message to be sent to the caller is selected in steps subsequent to ST311 depending on the time of call and the identity of the caller. In step ST311, the caller number registration table is examined so as to determine if time-dependent switching is set up for the caller. If it is determined that time-dependent switching is set up for the caller, the time of call is detected by a timer circuit included in the time monitor unit shown in FIG. 1 (ST312). If the time of call from the caller is included in a first time zone, an answer message designated for the caller and the first time zone is selected (ST313). Subsequently, the caller can record a message (ST314).

If it is not determined that the time of call from the caller is not included in the first time zone, an answer message designated for the caller and a second time zone is selected (ST315). Subsequently, a message from the caller is recorded (ST314). If the call is from a caller for which time-dependent switching is not set up, a predetermined message designated for the caller is selected and sent to the network (ST316). Subsequently, a message from the caller is recorded (ST314). Control is then turned to step ST309.

As has been described, the mobile communication terminal according to the first embodiment is provided with the capability of selecting an answer message depending on the caller and the forced alert capability for alerting the user of the terminal when there is a call from a designated caller. Further, the answer message selecting capability is controlled in accordance with the time. Accordingly, the user of the terminal can properly set up the terminal for expected callers.

Embodiment 2

Figure 5:
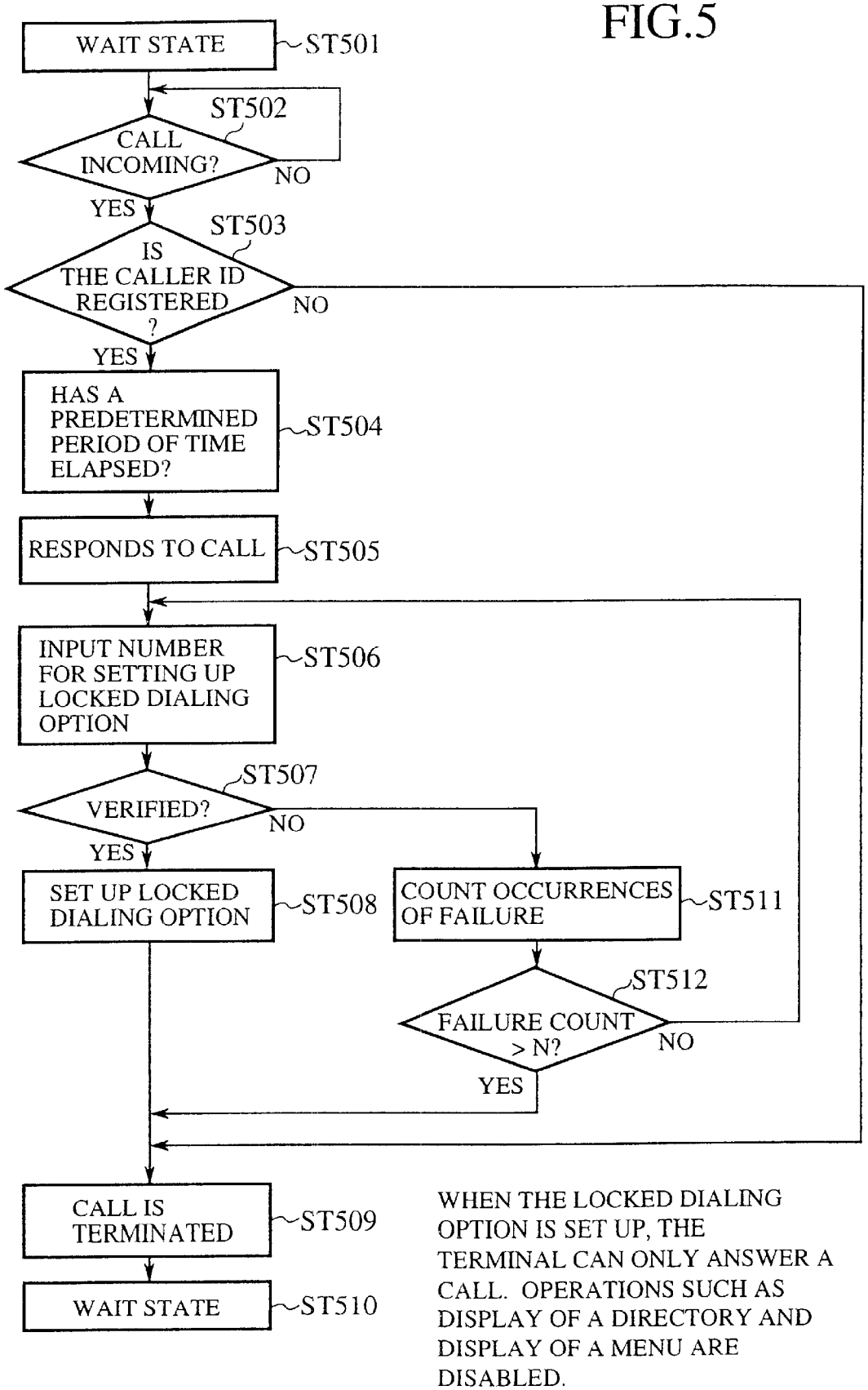
FIG. 5 is flowchart showing how a remote operation in a mobile communication terminal is controlled according to a second embodiment of the present invention.

FIG. 5 is a flowchart showing how a remote operation function of a mobile communication terminal is controlled according to the second embodiment. It is assumed that a portable telephone set (hereinafter, simply referred to as a terminal) is in a wait state (ST501). When a call arrives at the terminal (ST502), a determination is made as to whether the caller ID retrieved from the call setting message is registered in the caller number registration table and whether the caller is authorized to perform a remote operation (ST503). If it is determined that the caller is registered and authorized to perform a remote operation, after a predetermined period of time elapses (ST504), the terminal responds to the call (ST505).

When the caller inputs a number for setting up the locked dialing option (ST506), the terminal verifies the input number (ST507). If the input number is verified, the locked dialing option is set up (ST508). When the locked dialing option has been set up, the call is terminated (ST509), whereupon the terminal is placed in a wait state. When the number input for the locked dialing option is not verified, the number of times that the verification fails is counted (ST511). When the number of times exceeds a predetermined count, control is returned to step ST506.

As has been described, the mobile communication terminal according to the second embodiment does not require an input of a password. Therefore, the user can set up a locked dialing option whenever necessary. By configuring the telephone set at home as the only authorized terminal, it is possible to prevent strangers from setting up the locked dialing option.

Embodiment 3

Figure 6:
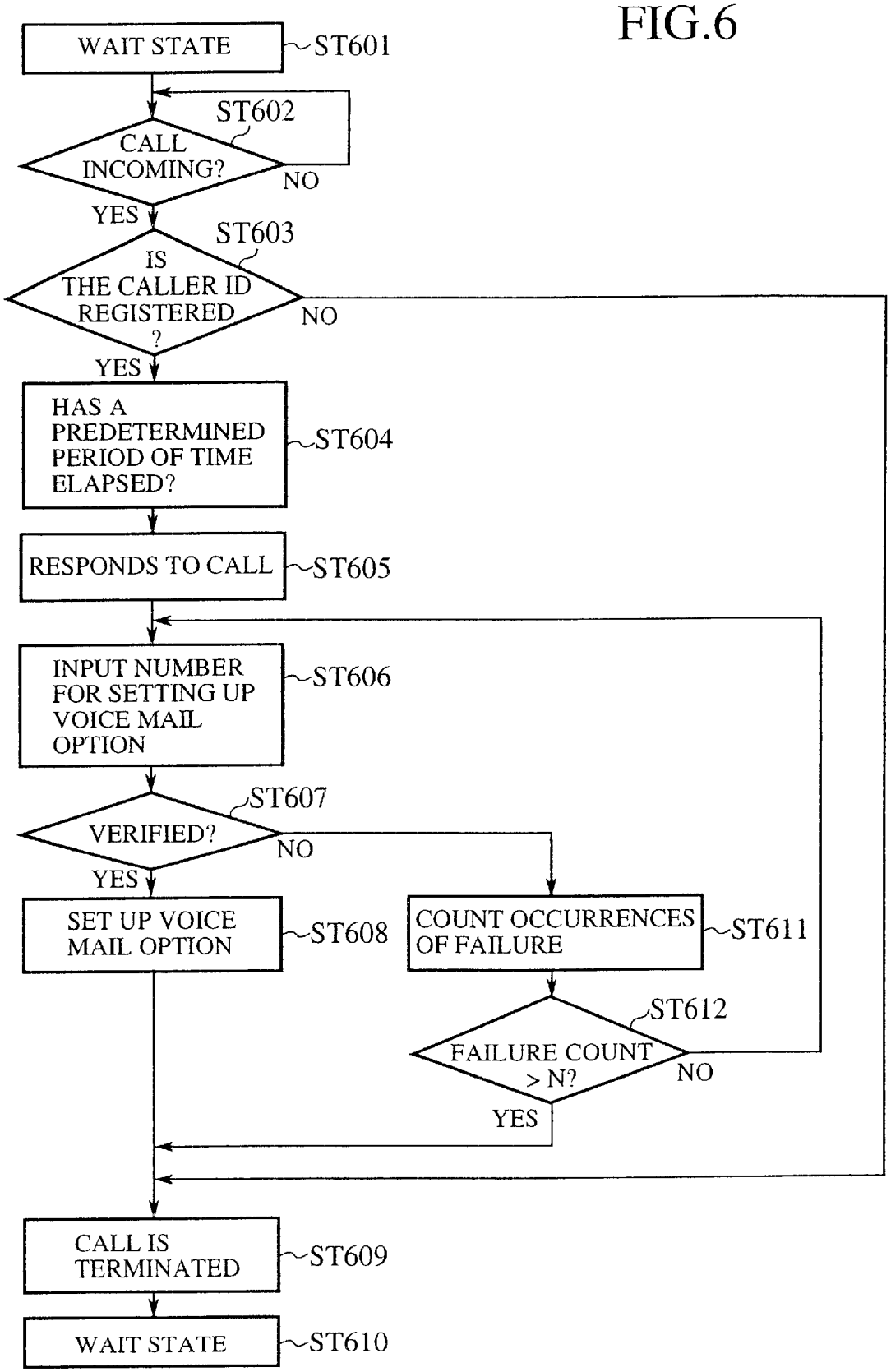
FIG. 6 is a flowchart showing how a remote operation in a mobile communication terminal is controlled according to a third embodiment of the present invention.
Figure 7:
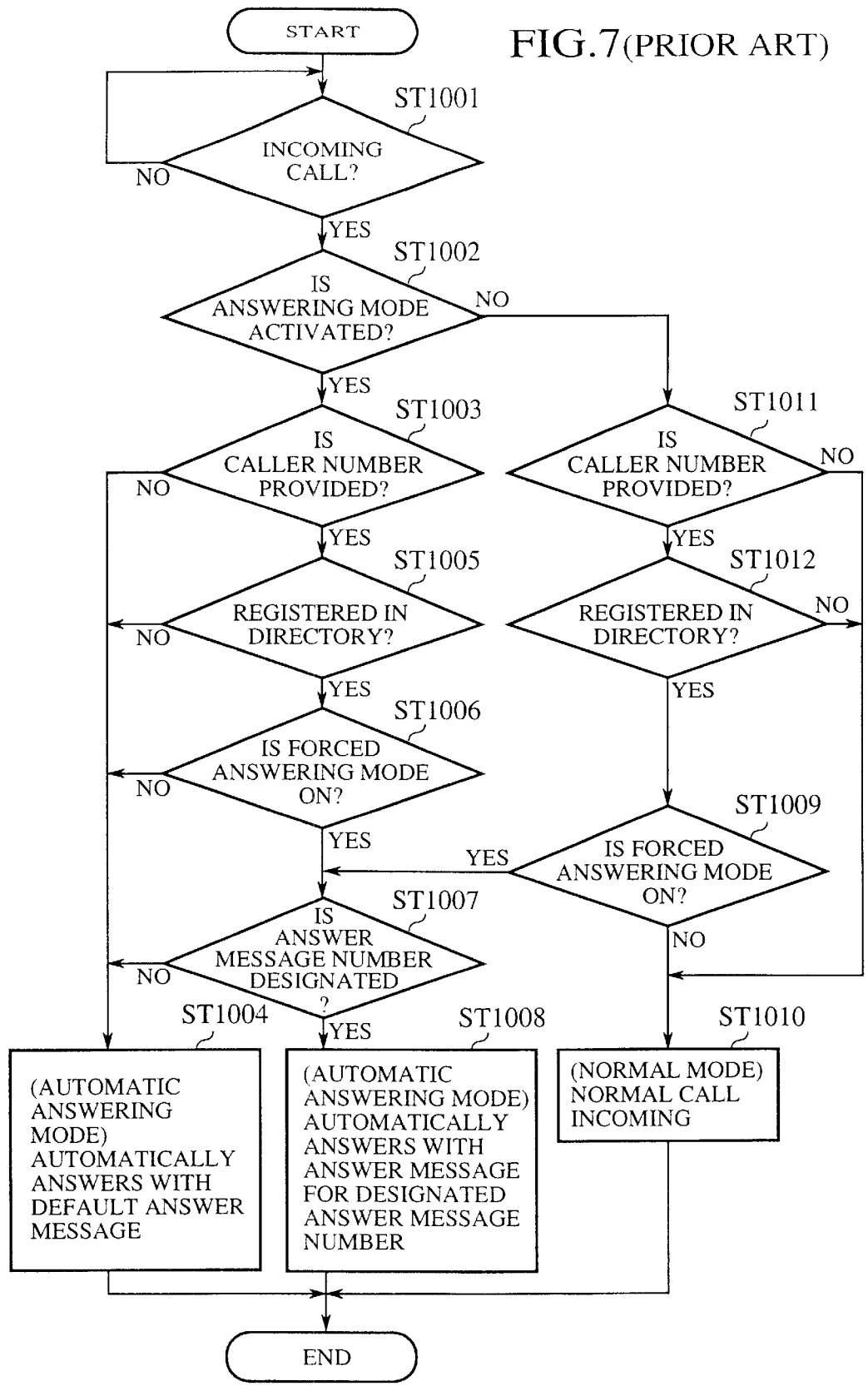
FIG. 7 is a flowchart showing how an answering function of a mobile communication terminal is controlled according to the related art.

FIG. 6 is a flowchart for controlling the voice mail function of a mobile communication terminal according to the third embodiment. It is assumed that a portable telephone set (hereinafter, simply referred to as a terminal) is in a wait state in step ST601. When a call arrives at the terminal (ST602), a determination is made as to whether the caller ID retrieved from the call setting message is registered in the caller number registration table and whether the caller is authorized to perform a remote operation (ST603). If it is determined that the caller is registered and authorized to perform a remote operation, after a predetermined period of time elapses (ST604), the terminal responds to the call (ST605).

When the caller inputs a number for setting up a voice mail option (ST606), the input number is verified (ST607). If the input number is verified, the voice mail option is set up (ST608). When the voice mail option has been set up, the call is terminated (ST609) so that the terminal is placed in a wait state (ST610). If the input number is not verified, the number of times that the verification fails is counted (ST611). If the number of times exceeds a predetermined count (ST612), control is turned to step ST606.

As has been described, the mobile communication terminal according to the third embodiment does not require an input of a password to set up a voice mail option remotely. Thus, even when the user has forgot the password, the user can still set up a voice mail option.

The present invention is not limited to the above-described embodiments and variations and modifications may be made without departing from the scope of the present invention.

What is claimed is:

1. A mobile communication terminal, comprising:

a time monitor that detects the time that an incoming call signal is received from an originating terminal, said incoming call signal including caller ID information;

a caller ID storage device that stores preselected caller ID information and associates specific call answering message information with each stored caller ID, wherein at least one caller ID has associated therewith different call answering messages based on the time that said incoming call signal is received;

a call answering message storage device for storing call answering messages associated with specific call answering message information stored in said caller ID storage device, and a preset call answering message not associated with any call answering message information in said caller ID storage device; and a call answering message selector that receives an incoming call signal caller ID and receives from said time monitor the time that the incoming call signal is received, determines whether said incoming call signal caller ID is stored in said caller ID storage device, and if so whether different call answering message information is stored for said incoming call signal caller ID based on the time that said incoming call is received, retrieves a call answering message from said call answering message storage device based on the results of said determinations, and outputs said retrieved call answering message when a user of said mobile communication terminal has failed to answer said incoming call;

whereby incoming calls for the same user of said mobile communication terminal are capable of receiving different call answering messages based on the received caller ID, and the time that the incoming call from a particular caller as identified by said caller ID is received.

2. A mobile communication terminal as set forth in claim 1, wherein said preselected caller ID information includes a caller's number and a caller's name corresponding to the caller's number, and a time-dependent control code associated with a caller's number for designating different call answering messages for answering incoming calls depending upon the time that a particular call is received from a caller having caller ID information stored in said caller ID storage device.

3. A mobile communication terminal as set forth in claim 1, wherein said preselected caller ID information includes a caller's number and a caller's name corresponding to the caller's number, and a forced alert control code associated with a caller's number for triggering a forced alert option to alert a user of the mobile communication terminal of the presence of an incoming call from a caller having a forced alert control code associated with said caller ID information stored in said caller ID storage device.

4. A mobile communication terminal as set forth in claim 1, wherein said preselected caller ID information includes a caller's number and a caller's name corresponding to the caller's number, and a locked dialing control code associated with a caller's number for allowing a caller to set a locked dialing option in said mobile communication terminal to prevent said mobile communication terminal from being used to make outgoing calls, whereby a user who has lost or misplaced the mobile communication terminal may call the terminal from a predesignated calling terminal to prevent the mobile communication terminal from being used by unauthorized persons.

5. A mobile communication terminal as set forth in claim 1, wherein said preselected caller ID information includes a caller's number and a caller's name corresponding to the caller's number, and a voice mail control code associated with a caller's number for allowing a caller to set a voice mail option in said mobile communication terminal from a predesignated calling terminal whereby a voice mail function in said mobile communication terminal may be set up remotely by an authorized user as identified from said stored caller number.

* * * * *